(12) United States Patent
Raja

(10) Patent No.: US 9,792,605 B2
(45) Date of Patent: Oct. 17, 2017

(54) SYSTEM AND METHOD FOR SPLIT PAYMENT CARD ACCOUNT TRANSACTIONS

(71) Applicant: MasterCard International Incorporated, Purchase, NY (US)

(72) Inventor: Stephen Suganth Raja, Saint Charles, MO (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 14/534,521

(22) Filed: Nov. 6, 2014

(65) Prior Publication Data

US 2016/0132867 A1    May 12, 2016

(51) Int. Cl.
| | |
|---|---|
| G06Q 20/34 | (2012.01) |
| G06Q 40/02 | (2012.01) |
| G06Q 20/20 | (2012.01) |
| G06Q 20/32 | (2012.01) |
| G06Q 20/22 | (2012.01) |
| G06Q 40/00 | (2012.01) |

(52) U.S. Cl.
CPC ......... *G06Q 20/3572* (2013.01); *G06Q 20/20* (2013.01); *G06Q 20/22* (2013.01); *G06Q 20/322* (2013.01); *G06Q 20/34* (2013.01); *G06Q 20/351* (2013.01); *G06Q 20/357* (2013.01); *G06Q 40/02* (2013.01)

(58) Field of Classification Search
USPC .......................................... 705/16
See application file for complete search history.

(56) References Cited

U.S. PATENT DOCUMENTS

| | | | | |
|---|---|---|---|---|
| 8,606,709 B2* | 12/2013 | Gupta | ............... | G06Q 20/10 705/40 |
| 2006/0259390 A1* | 11/2006 | Rosenberger | .......... | G06Q 20/04 705/35 |
| 2009/0094125 A1* | 4/2009 | Killian | ............... | G06Q 20/0855 705/17 |
| 2012/0310760 A1 | 12/2012 | Phillips et al. | | |

* cited by examiner

*Primary Examiner* — Garcia Ade
(74) *Attorney, Agent, or Firm* — Buckley, Maschoff & Talwalkar LLC (57) ABSTRACT

A method includes receiving a first account indicator, where the first account indicator identifies a first financial account. The method further includes receiving a second account indicator, which identifies a second financial account. Still further, the method includes receiving a split signal, which indicates how future transactions are to be divided between the first financial account and the second financial account. The split signal may have been generated in response to interaction by an account holder with a slide-bar display element of a user interaction screen display.

7 Claims, 5 Drawing Sheets

SYSTEM AND METHOD FOR SPLIT PAYMENT CARD ACCOUNT TRANSACTIONS

BACKGROUND

Payment card accounts such as credit card accounts and debit card accounts are in widespread use. In one conventional manner of accessing a payment card account, the account holder presents a plastic card at the point of sale in a retail store. The point of sale device reads account information from the card (e.g., via a magnetic stripe or through wireless communication with an integrated circuit in the card, or via electrical contacts on the card) and initiates a payment card account transaction using the information read from the card.

Many users of payment card accounts may have more than one such account. In some cases, card account holders may find it desirable to split a purchase transaction between two or more of their accounts. However, with the exception of some restaurants, retail establishments typically do not readily accommodate splitting of purchase transactions between payment card accounts. Moreover, even where a retailer does accommodate a split payment, the mechanics of implementing the transaction are likely to be somewhat cumbersome.

The present inventor has now recognized an opportunity for a highly convenient way to implement split payments using payment card accounts.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a user may pre-indicate a percentage split of his/her payment transactions among two or more of his/her payment card accounts. The user may be permitted to do so via a highly convenient slide-bar graphical user interface display and/or via an IVR (interactive voice response) system. The payment card accounts, plus the pre-selected split percentages, may be associated with a proxy payment card account number that may be issued to the user via a physical proxy payment card. After set-up and issuance of the proxy payment card has occurred, the user may initiate a split payment transaction simply by offering the proxy payment card at the point of sale.

Figure 1:
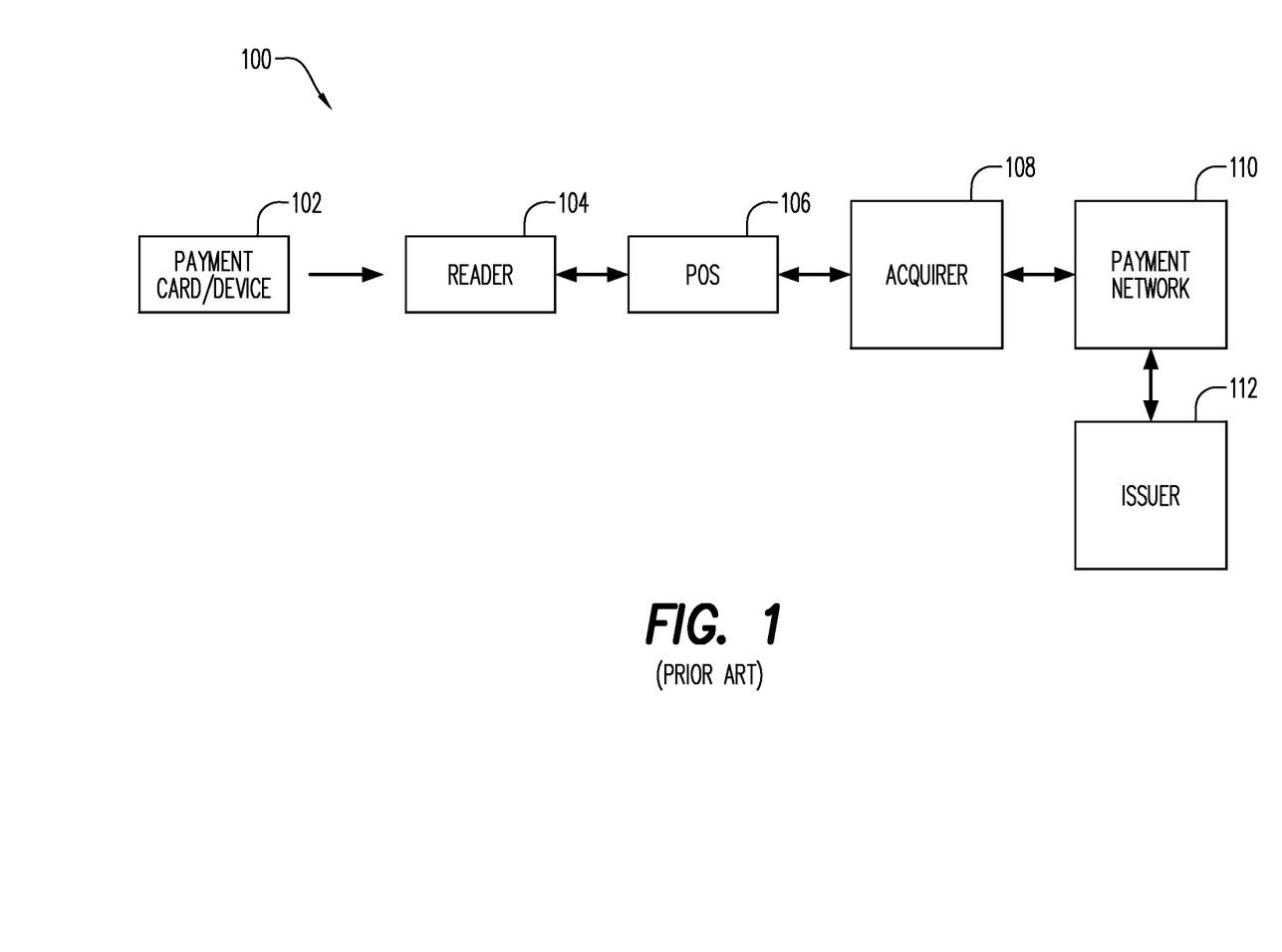
FIG. 1 is a block diagram that illustrates a conventional payment system.

By way of background, a conventional payment system will first be briefly described. FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc.

The system 100 further includes a reader component 104 associated with a POS terminal 106. In some known manner (depending on the type of the payment card/device 102) the reader component 104 is capable of reading the payment card account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment cards or other devices for initiating payment transactions by presenting an associated payment card account number to the reader component of a POS terminal.

Figure 2:
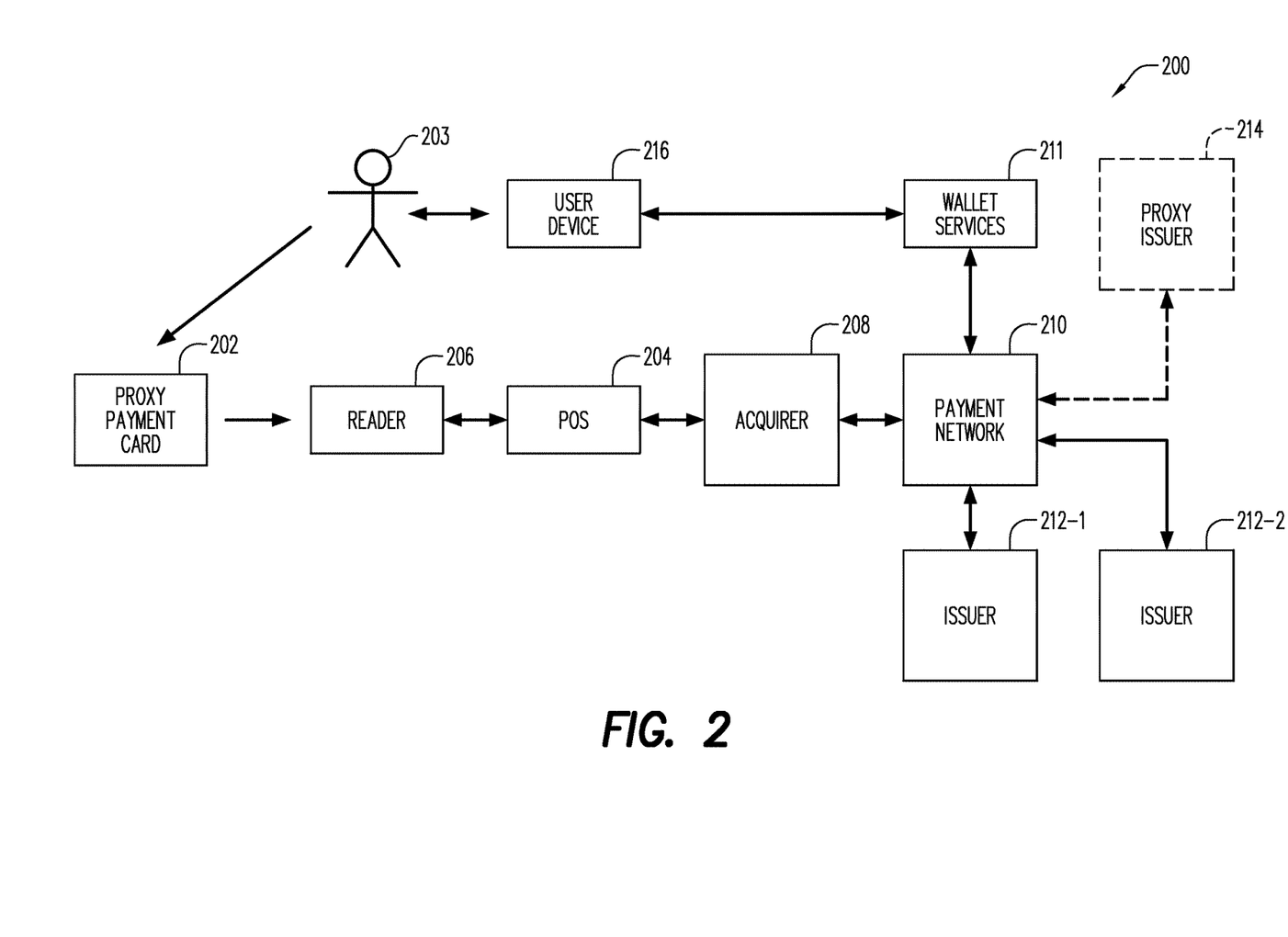
FIG. 2 is a block diagram that illustrates a payment system provided in accordance with aspects of the present invention.

FIG. 2 is a block diagram that illustrates a payment system 200 provided in accordance with aspects of the present invention. (As was the case in FIG. 1, the payment system is depicted in FIG. 2 only in terms of components needed for a single transaction; in practice, and as will be discussed below, the payment system 200 may include many more instances of at least some components.)

As illustrated in FIG. 2, the payment system 200 includes a proxy payment card 202. The card 202 is referred to as a "proxy" card because the card number stored therein may not directly correspond to a payment card account number or PAN (primary account number). Rather, as described in more detail below, the card number on the proxy payment card 202 provides convenient access to a previously designated purchase transaction splitting arrangement. According to the transaction splitting arrangement, the purchase at the point of sale is to be split according to pre-designated percentages between two or more payment card accounts belonging to the account holder/user (indicated at 203 in FIG. 2). In some embodiments, the user's payment card accounts are each identified by a respective PAN, which may be different from the proxy card number stored in the proxy payment card 202. In some embodiments, the proxy payment card 202 may differ from a conventional payment card in terms of the significance and usage accorded in the payment system 200 to the card number stored on the card. In some embodiments, the user 203 may present a payment-enabled device that is not card-shaped—e.g., instead of the proxy payment card 202 shown in FIG. 2, the user may present a payment-enabled smartphone (not shown) that stores the above-mentioned proxy card number.

In some embodiments, the proxy card number stored in the proxy payment card 202 may be include, e.g., 16 or 15 digits as is commonly the case with payment card account numbers.

Also included in the payment system 200 are a POS terminal 204, its associated card reader 206 and an acquirer computer 208.

In addition, the payment system 200 may include a payment network 210, which may provide functionality in accordance with aspects of the present invention, in addition to providing other functions of a typical payment network. A wallet services computer 211 is associated with the payment network 210 and may in some embodiments be integrated with one or more computers used for transaction routing and other other functions of the payment network 210. Details of the wallet services computer 211 will be described below in connection with FIGS. 3-5.

Also included in the payment system 200 are payment card issuer server computers 212-1 and 212-2. The payment card issuer server computers 212-1 and 212-2 may be respectively operated by the financial institutions that are the issuers of the user's payment card accounts to be accessed via the proxy payment card 202.

A proxy issuer computer 214 is shown in phantom in FIG. 2. The proxy issuer computer 214, if present, may be operated by the financial institution that issued the proxy payment card 202 to the user 203, in a case where the proxy payment card 202 was not issued by, say, the issuing FI for one of the user's payment card accounts.

The payment system 200 also includes a user device 216. The user device 216 may, for example, be a personal computer, laptop computer, tablet computer or smartphone. The user device 216 may, for example, run a browser program to allow the user 203 to operate the user device 216 to access a website hosted by the wallet services computer 211. In some embodiments, the user device 216 may be programmed with a suitable application program (e.g., an app distributed by the proxy card issuer) to facilitate interaction between the user 203 and the wallet services computer 211 in a manner as described below.

It is worth noting again that in practical embodiments of the system 200 the number of a particular type of component in the system may be considerably greater than the one or two components of that type shown in the drawing. Several payment networks may actually be involved, along with quite a large number of card account issuers and acquiring financial institutions, and of course numerous merchants and many, many cards and cardholders. As will be understood from the above description of the conventional payment system 100, the payment system 200 shown in FIG. 2 may process many transactions, including simultaneous transactions.

Figure 3:
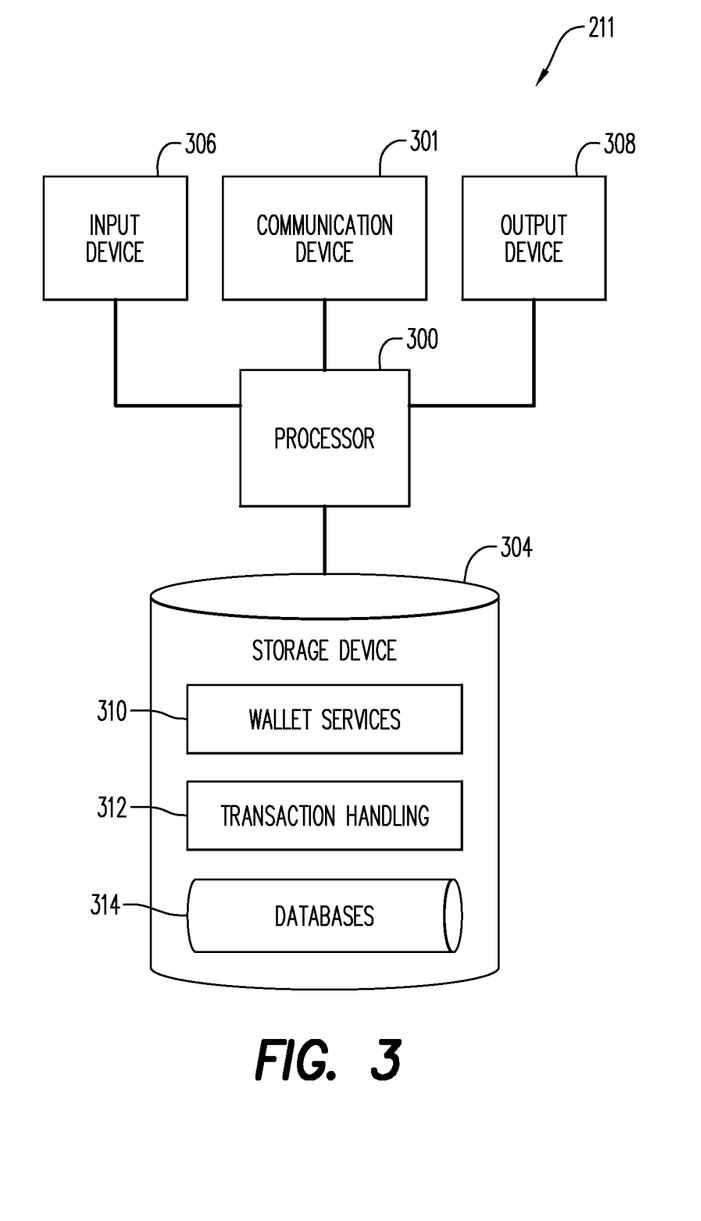
FIG. 3 is a block diagram that illustrates a computer system that may be operated as part of the system of FIG. 2 and in accordance with aspects of the present invention.

FIG. 3 is a block diagram that illustrates an example embodiment of the wallet services computer 211 as shown in FIG. 2 and provided in accordance with aspects of the present invention.

Referring now to FIG. 3, the wallet services computer 211 may be controlled by software to cause it to function as described herein. As noted above, the wallet services computer 211 may be integrated with, or may overlap with, one or more computers used to perform functions of the payment network 210.

The wallet services computer 211 may include a computer processor 300 operatively coupled to a communication device 301, a storage device 304, an input device 306 and an output device 308.

The computer processor 300 may be constituted by one or more processors. Processor 300 operates to execute processor-executable steps, contained in program instructions described below, so as to control the wallet services computer 211 to provide desired functionality.

Communication device 301 may be used to facilitate communication with, for example, other devices (such as, for example, the user device 216 and similar devices operated by other cardholder-users). Communication device 301 may comprise numerous communication ports (not separately shown), to allow the wallet services computer 211 to communicate simultaneously with a number of other computers and other devices, including communications as required to simultaneously handle numerous transactions and interactions with users.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the wallet services computer 211, executed by the processor 300 to cause the wallet services computer 211 to function as described herein.

The programs may include one or more operating systems (not shown) that control the processor 300 so as to manage and coordinate activities and sharing of resources in the wallet services computer 211, and to serve as a host for application programs (described below) that run on the wallet services computer 211.

The programs stored in the storage device 304 may also include one or more programs 310 that control the processor 300 to enable the wallet services computer 211 to provide account set-up and user enrollment functions for digital wallet services and split payment services as described herein. The storage device 304 may also store one or more programs 312 that control the processor 300 to enable the wallet services computer 211 to handle individual split payment transactions, in a manner described below.

The storage device 304 may also store, and the wallet services computer 211 may also execute, other programs, which are not shown. For example, such programs may include a reporting application, which may respond to requests from system administrators for reports on the activities performed by the wallet services computer 211. The other programs may also include, e.g., one or more data communication programs, a database management program, device drivers, etc.

The storage device 304 may also store one or more databases 314 required for operation of the wallet services computer 211. Such databases may include, for example, a database (not separately indicated in FIG. 3) for storing data corresponding to split payment preferences uploaded by users to the wallet services computer 211 in a manner described below.

Holders of payment card accounts may have various reasons for wishing to split purchase transactions among two or more payment card accounts. For example, various accounts may provide different benefits or incentives for using the accounts—one account may provide loyalty points or airline miles or the like, while another account or accounts may provide a cash-back benefit for using the account. It may be the account holder's wish that he/she regularly and consistently accumulate benefits from two or more of such accounts while engaging in purchases on a routine basis. Therefore, it may be beneficial to the account holder if routine purchases with a payment card automatically result in the account holder's desired splitting of the purchase amount between/among payment card accounts. The ensuing discussion covers both a set-up process that enables seamless transaction payment splitting, and also covers a typical split payment transaction process.

Figure 4:
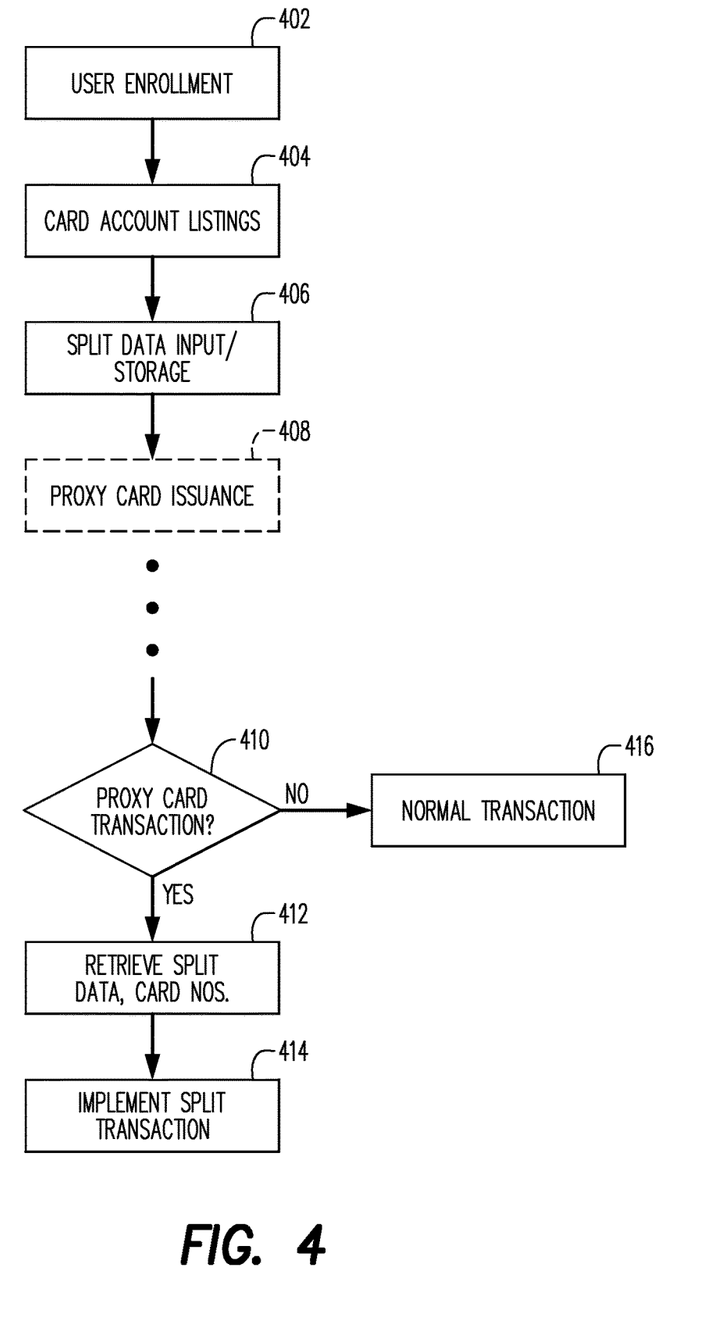
FIG. 4 is a flow chart that illustrates functionality that may be provided by the computer system of FIG. 3 in accordance with aspects of the present invention.

FIG. 4 is a flow chart that illustrates functionality that may be provided by the wallet services computer 211 in accordance with aspects of the present invention.

At block 402 in FIG. 4, a user/account holder commences a sign-up process for wallet services with transaction splitting, to be provided by the wallet services computer 211. It is assumed for purposes of block 402 that the user already has two or more payment card accounts, which may have been issued by the same financial institution or by more than one financial institution. The process of block 402 may include the user operating his/her device 216 (FIG. 2) to access a website hosted by the wallet services computer 211. In interacting with the website, the user may establish a user account for the website and may enter identifying information such as name, address, phone number, email address, etc. As part of this step, the user may also be required to select and enter a password to secure the user's future access to the website.

At block 404, in response to prompting from the website, the user may enter two or more payment card account numbers corresponding to the payment card accounts between/among which future purchase transactions are to be split. In some embodiments, the user may also be prompted to enter nicknames for the accounts, such as "miles card", "points card", "cashback card", "Bank A card", etc. As part of the process of block 404, the wallet services computer 211 may receive from the user/user device 216 respective account indicators (e.g., PANs) that identify the user's payment card accounts. This may include receiving a first indicator for a first account, a second indicator for a second account, etc.

At block 406, the wallet services computer 211 may receive and store input that indicates the user's preference in terms of how future purchase transactions are to be split between/among the accounts identified at 404. Details of the process of block 406 will now be described with reference to FIG. 5.

Figure 5:
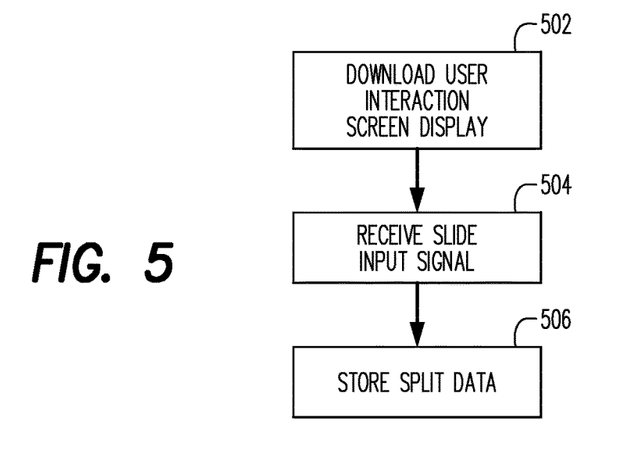
FIG. 5 is a flow chart that illustrates addition details of the functionality illustrated in FIG. 4.
Figure 6:
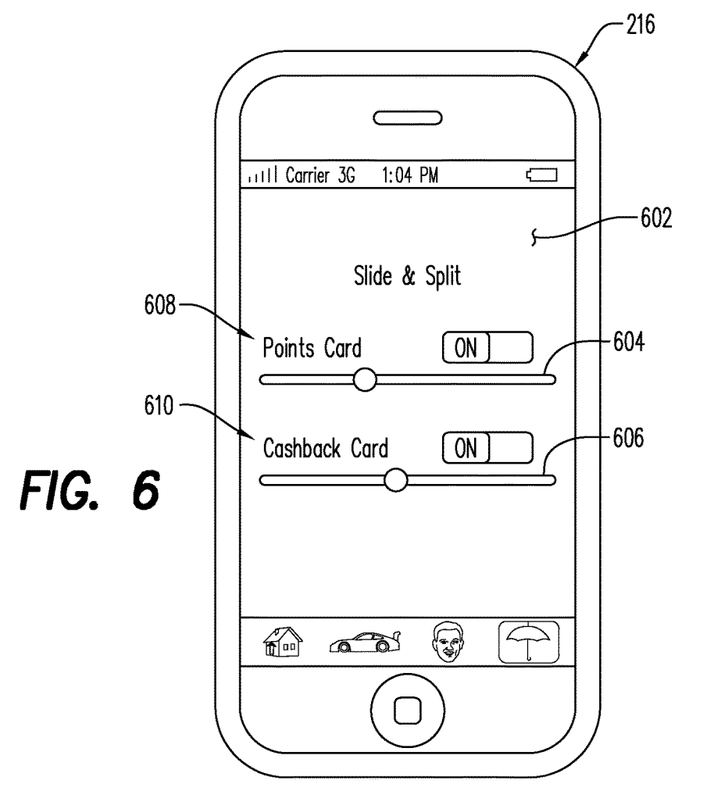
FIG. 6 shows an example screen display that may be presented to a user in accordance of aspects of the present invention.

At block 502 in FIG. 5, the wallet services computer 211 may download, to the user device 216, a user interaction screen display. An example of such a screen display is shown in FIG. 6. For purposes of FIG. 6 it is assumed that the user device 216 is a smartphone with a touchscreen of substantial size. Referring to FIG. 6, the screen display 602 may include slide-bar display elements 604 and 606. Each of the slide-bar elements 604 and 606 is associated with a respective payment card account nickname 608 or 610. The account nicknames are an indication to the user as to which account will be affected by the user's interaction with the respective slide-bar.

In some embodiments, numerical indications (not shown) may also be provided (e.g., "60%" in association with one account nickname, "40%" in association with the other) to indicate to the user what percentage split between the accounts the user has selected by interacting with the slide-bar display elements. The user may change the split percentages by interacting with one or both of the slide-bars. It will be appreciated that the respective split percentages selected by the user for the underlying payment card accounts will sum to 100%.

Although only two payment card accounts are displayed for setting split payment percentages in the embodiment shown in FIG. 6, in other embodiments, three or more accounts may be displayed.

The user interactions with the slide-bars are reflected by one or more signals received by the wallet services computer 211 from the user device 216 (block 504, FIG. 5). This signal or signals indicate how future purchase transactions by the user are to be divided between the payment card accounts listed with the wallet services computer 211 at 404 in FIG. 4. The signals may be considered "split signals", and the corresponding split percentages are stored by the wallet services computer 211 in association with the PANs for the listed payment card accounts, as indicated by block 506 in FIG. 5. The corresponding data entry is also associated with the user's data entry as a recipient of services from the wallet services computer 211.

Reference is again made to FIG. 4. Following block 406 (as detailed in FIG. 5) is a block 408 in FIG. 4. Block 408 is shown in dashed-line form to suggest that at least part of the function represented by block 408 may be performed by a system component other than wallet services computer 211. In some embodiments, block 408 may entail the wallet services computer 211 communicating with a financial institution to trigger issuance by the financial institution of the proxy payment card 202 shown in FIG. 2. As noted above, the proxy payment card 202 may be a mechanism for the user 203 to conveniently access his/her preferred split payment arrangement for future payment card account purchase transactions. Issuance of the proxy payment card 202 may include the financial institution generating or selecting a proxy card number to be stored in the proxy payment card. The financial institution may communicate the proxy card number to the wallet services computer 211, which may store the proxy card number in association with the user's data entry, the user's PANs and the user's preferred split payment percentages. As will be seen, the user's proxy card number is the link within the payment system 200 to the payment card account percentage split that was selected by the user. In some embodiments, the proxy card number is different from all of the PANs that correspond to the underlying payment card accounts.

In some embodiments, the proxy card numbers are generated with BIN (bank identification number) ranges that are used only for numbers of this type. Accordingly, with this arrangement, a proxy card number can be identified as such simply by reference to the BIN portion of the number.

With issuance and mailing of the proxy payment card 202 to the user 203, the set-up of the user's desired split payment arrangement is complete. The user 203 may now proceed to engage in purchase transactions with split payments, in accordance with his/her preference as stored in the wallet services computer 211, in essentially the same manner— from the user's point of view—as payment card account purchase transactions that do not include the split payment feature.

Thus, referring again to FIG. 2, in a typical split payment transaction in accordance with aspects of the present invention, the user 203 presents the proxy payment card 202 to the reader component 206 of the POS terminal 204. In this transaction, the reader, the POS terminal and the acquirer computer 208 may all operate to (a) read the proxy card number from the card 202, and (b) route an authorization request including the proxy card number (as a pseudo-PAN) to the payment network 210. The transaction as handled at the payment network 210/wallet services computer 211 will now be described further with reference once more to FIG. 4. For the purposes of the balance of FIG. 4, it will be assumed that the processing capabilities of the payment network 210 are integrated with those of the wallet services computer 211, and accordingly the integrated processing capability will be referred to as "the wallet services computer 211" in the ensuing discussion of the balance of FIG. 4.

In FIG. 4, at some point in time after steps 402-408, an authorization request is received at the wallet services computer 211, leading to decision block 410 in FIG. 4. At decision block 410, the wallet services computer 211 may determine whether the card number contained in the authorization request indicates that the transaction was initiated from a proxy payment card of the type described above. As suggested above, in some embodiments this determination may be made by determining whether the BIN portion of the card number corresponds to a BIN range that is dedicated to use in proxy card numbers. If a positive determination is made at decision block 410 (i.e., if the transaction was initiated with a proxy payment card 202), then block 412 may follow decision block 410.

At block 412, the wallet services computer 211 may use the proxy card number to retrieve the PANs and the split percentages that were previously stored in the wallet services computer 211 for the user of the proxy card in question.

Block 414 may follow block 412. At block 414, the wallet services computer 211 may generate payment card transaction authorization requests to implement the requested transaction in a manner that splits the transaction between/among the payment card accounts listed by the user at 404, and in accordance with the split percentages selected by the user at 406. That is, the wallet services computer 211 may generate a respective authorization request for each PAN previously listed by the user (and designated with a nonzero percentage), with the amount for the respective authorization requests being obtained by applying the selected percentage for the payment card account in question to the total transaction amount for the request transaction. The authorization requests generated by the wallet services computer 211 at 414 may be routed to the issuer or issuers (reference numerals 212-1 and 212-2, FIG. 2) identified by the PANs. Assuming that the resulting authorization responses from the issuer(s) indicate approval, then the wallet services computer 211 may route an authorization response to the POS terminal 204 to indicate that the transaction has been approved. The transaction at the point of sale may then be completed and the user 203 may then depart from the retail store with the purchased items.

Considering again decision block 410, if a negative determination is made at that decision block (i.e., if the wallet services computer 211 determines that the authorization request from the POS terminal 204 does not contain a proxy card number), then the process of FIG. 4 branches from decision block 410 to block 416. At block 416, the transaction may be processed, e.g., like the transaction described in connection with FIG. 1.

In subsequent clearing of a split payment transaction as described in connection with FIG. 4, settlement may occur from the two or more underlying payment card accounts to the merchant's acquirer bank for the benefit of the merchant.

In the event of a return of the purchased item(s) to the merchant, the chargeback of the transaction is split in the same manner as the original purchase transaction.

In the example transaction described above in connection with FIG. 4, the wallet services computer 211 initiates the two or more authorization requests to the underlying payment card accounts to implement the split payment for the transaction. In other embodiments, the authorization requests may be generated by another party, such as the issuer of the proxy payment card 202. The other party, in such a case, may initiate the authorization requests in response to a suitable communication from the wallet services computer 211. Thus the role of the wallet services computer 211 in implementing the split payment in such cases may be to provide the necessary information to the proxy payment card issuer.

If the user 203 wishes to change the percentages according to which transactions are to be split, and/or wishes to add or subtract an underlying payment card account, the user may again access the website hosted by the wallet services computer 211. The user 203 may again interact with the user interaction screen display of FIG. 6 to enter new percentages to replace the percentages previously stored for the user by the wallet services computer 211. Thus one or both of steps 404 and 406 of FIG. 4 may be performed again at the user's option, resulting in establishment of new split percentages for future transactions.

In some embodiments, a proxy payment card is not employed. Instead, a payment card that carries a PAN may be used to initiate a split payment transaction. To facilitate such an embodiment, the wallet services computer 211 may be configured to store and recognize PANs that have been designated to automatically access two or more payment card accounts for split payment purposes.

In the above description of FIGS. 4 and 5, the user listed underlying payment card accounts for payment splitting and indicated desired split percentages via access to a website, and particularly via interaction with a screen display such as that shown in FIG. 6. Alternatively, however, in some embodiments, the user may enter some or all of such information, possibly including split percentages, by interacting with an IVR (interactive voice response) unit (not shown), which may be associated with the wallet services computer 211. In some embodiments, both online and IVR data entry options may be available to users.

In connection with the type of split payment transaction described in connection with FIG. 4, it could on occasion occur that one of the authorization requests initiated to the underlying payment card accounts may be declined. In such a case, the wallet services computer 211 may be programmed to charge the transaction to one or more other underlying payment card accounts listed by the user, so that the transaction as a whole is executed.

In examples described above, the payment for a transaction is split between or among two or more payment card accounts. It will be appreciated that payment card accounts may also be referred to as "financial accounts". In some embodiments, some or all of the accounts that fund the transaction (i.e., among which the transaction is split) may be financial accounts other than payment card accounts. For example, one or more of the underlying accounts may be demand deposit accounts maintained at a bank or other financial institution.

In example transactions described herein, the transaction was initiated at a retail store using a physical proxy payment card. However, in some embodiments, the user may also or alternatively be able to use the proxy card number in online purchases, either by entering the proxy card number as part of the user's interaction with an e-commerce website or on a quasi "card on file" arrangement with the e-commerce retailer. In either case, the use of the proxy card number for the transaction may result in a split payment in substantially the same manner as was described above in connection with FIG. 4.

With a split payment arrangement as described herein, the user can conveniently divide individual purchase transactions on a pre-selected percentage basis between or among two or more payment card accounts, simply by using a proxy payment card at the point of sale. The user can readily pre-indicate his/her preferred split payment percentages for the underlying accounts, and can also readily change the percentages from time to time, via a highly convenient and intuitive slide-bar-based data entry screen display.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:

receiving, in a split payment computer, a first account indicator, the first account indicator identifying a first financial account;

receiving, in the split payment computer, a second account indicator, the second account indicator identifying a second financial account; and receiving, in the split payment computer, a split signal, the split signal indicating how future transactions are to be divided between the first financial account and the second financial account; the split signal indicating a first percentage of a given one of said future transactions to be charged to said first financial account and a second percentage of said given one of said future transactions to be charged to said second financial account; the split signal having been generated in response to an interaction by a holder of the first and second financial accounts with a slide-bar display element of a user interaction screen display;

said given one of said future transactions including a first authorization request processed in a computerized payment network for routing to a first issuer computer for charging said first percentage of said given one of said future transactions to said first financial account;

said given one of said future transactions including a first authorization response issued by said first issuer computer and routed in the computerized payment network;

said given one of said future transactions including a second authorization request processed in a computerized payment network for routing to a second issuer computer for charging said second percentage of said given one of said future transactions to said second financial account;

said given one of said future transactions including a second authorization response issued by said second issuer computer and routed in the computerized payment network;

said split payment computer including a processor and a storage device in communication with the processor, the first percentage and the second percentage stored in a data entry in the storage device.

2. The method of claim 1, further comprising:

storing, in the split payment computer, the received split signal, first account indicator and second account indicator;

receiving, in the split payment computer, a request for a payment card transaction, the request including a proxy payment card indicator;

using the proxy payment card indicator to retrieve the stored split signal, first account indicator and second account indicator; and implementing the requested payment card transaction in accordance with the retrieved split signal.

3. The method of claim 2, further comprising:

receiving, in the split payment computer, a replacement split signal, the replacement split signal replacing the first percentage with a third percentage different from the first percentage, and replacing the second percentage with a fourth percentage different from the second percentage, the third and fourth percentages summing to 100%.

4. The method of claim 3, further comprising:

storing, in the split payment computer, the replacement split signal in association with the first and second account indicators.

5. The method of claim 2, wherein the proxy payment card indicator was read from a payment card at a point of sale.

6. The method of claim 1, further comprising:

prior to said third receiving step, downloading, from the split payment computer, the user interaction screen display to a mobile device operated by said holder of said payment card accounts.

7. The method of claim 1, wherein the first financial account is a first payment card account and the second financial account is a second payment card account.

* * * * *